Jan. 11, 1938.   O. WITTEL   2,105,238
FILM STRIP
Filed Dec. 18, 1934
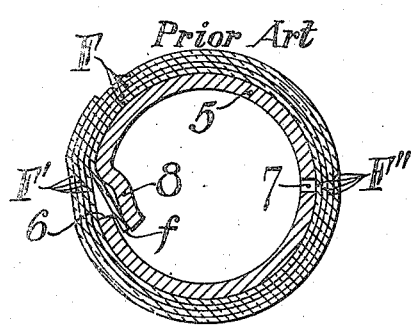
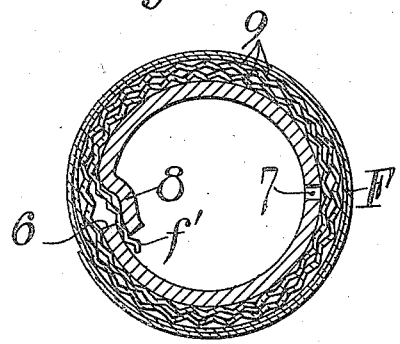
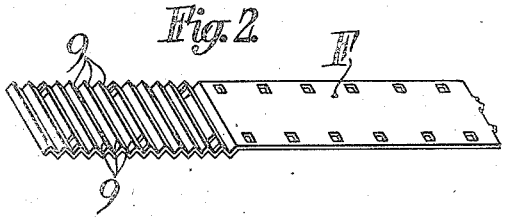
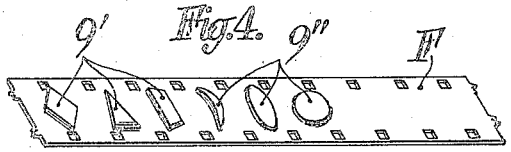
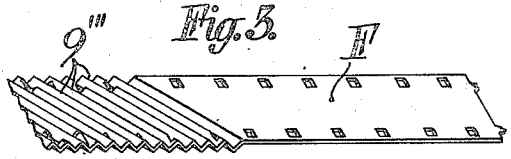
Inventor:
Otto Wittel,
Newton M. Perrins
By George A. Gillette, Jr.
Attorneys Patented Jan. 11, 1938

2,105,238

UNITED STATES PATENT OFFICE 2,105,238

FILM STRIP

Otto Wittel, Rochester, N. Y., assignor, by mesne assignments, to Eastman Kodak Company, Jersey City, N. J., a corporation of New Jersey Application December 18, 1934, Serial No. 758,085

5 Claims. (Cl. 242—74)

The present invention relates to an improved formation of a film strip, and more particularly to the formation of the trailer of a film strip so that embossings will not be caused upon shrinkage of the film by the margins of openings in the reel core.

The usual type of reel core is provided with at least one opening, such as the slot to receive the end of the film. The film is wound upon this core and if any shrinkage takes place, the inner convolutions of the film roll are placed under compression. Such compression forces the inner convolutions of the film against the edges or margins of any openings in the core so that the outlines of these openings are embossed into the adjacent convolutions of the film. Under some conditions of film shrinkage, these embossings may appear on more than 25 feet of 16 mm. film.

This embossing of the film as a result of shrinkage in the film may be reduced by modifying the core construction so that no sharp edges are presented to the inner convolution of film. However, such modification complicates winding and handling of the film and increases the ultimate cost of the film package. In addition, such mechanical appliances for preventing embossing of the film may be expelled into the camera mechanism, particularly in a high speed camera, to damage the interior parts thereof.

The primary object of the present invention is the provision in the trailer portion of a film strip of a plurality of flexible deformations.

Another object of the invention is the provision of a crimped trailer portion formed of a plurality of undulations in the rear end of a film strip and of such a length as to encircle the reel core at least once.

A further object of the invention is the provision of a crimped trailer portion on a film strip adapted, upon coiling of the film, to form a resilient or spongy center so that subsequent shrinkage in the film will merely compress this resilient center and not promote the formation of embossings on the film by the margins of any openings in the core.

Other and further objects of the invention will be suggested to those skilled in the art in the course of the following disclosure.

The above and other objects of the invention are attained merely by crimping the inner or rear end of a film strip which is to be coiled upon a core provided with one or more openings. Said crimped portion is provided by the formation throughout the thickness or depth of the film support of a plurality of embossings. These embossings, being formed from the film support, are flexible, form a resilient center for the coiled film, and may overlay, either in registered or staggered relation, the embossings on adjacent convolutions of the film.

Reference is hereby made to the accompanying drawing wherein similar reference characters designate similar elements, and wherein:

Fig. 1 is a cross-section of a coil of prior art film on a core which is provided with openings and illustrates the cause of objectionable embossings on the film under prior art conditions.

Fig. 2 is a perspective view of a fragment of film strip which has been crimped according to the present invention.

Fig. 3 is similiar to Fig. 2, except that the corrugations are provided to extend diagonally across the film.

Fig. 4 illustrates varied shapes and forms for the embossings in the film.

Fig. 5 is a cross-section through a reel core and a coil of film which has a crimped trailer portion.

The causes for objectionable embossings on coiled film will first be discussed and explained with respect to Fig. 1. The film core 5 is provided with a slot 6 and with a drainage opening 7. A deformed lip 8 is provided on the core 5 beneath the slot 6. The inner end $f$ of the film strip F may be inserted into the slot 6 and is guided, during such insertion, by the lip 8. The remainder of film strip F is then coiled or wound upon the core 5. It will be noted that there is an unsupported portion of the film across the slot 6 and a smaller portion of unsupported film across the drainage opening 7. If this film coil is allowed to stand for any appreciable length of time, considerable film shrinkage is bound to occur, or can only be avoided by storing the film under supervised and maintained atmospheric conditions.

As the film strip F shrinks, the diameter of the film coil decreases. The film core 5 is comparatively rigid and does not give way under the pressure created by this film shrinkage. As a result of said shrinkage, the adjacent and subjacent layers of film are stretched tightly at F' and F'' across the slot 6 and opening 7. The material of the film is more or less impressionable, and, as a result, the margins or edges of the slot 6 and opening 7 are embossed into the film or film support.

The objection to such embossing of the film is that when it passes through the exposure gate, the deformation or embossing causes the presser pad to be pressed back and the adjacent images on the film are out of focus. Upon projection of these images, a wavy effect is obtained which gives the appearance of an unsteady screen. Obviously, the elimination of these embossings is very desirable.

Curiously enough these objectionable embossings in the outer convolutions of the film are prevented in spite of film shrinkage by the provision of embossings in the trailer portion or inner end of the film strip. Such embossings may be provided in the form of corrugations, mounds, undulations, or in any form such that a resilient center is formed for the coiled film. Said embossings may be created in the film strip in any convenient or suitable manner, such as by passage between a pair of cooperating forming rolls.

The intended embossings may be provided in the film strip in any form or shape, the only requirement is that the embossings be such as to form a resilient center for the coiled film strip. Said embossings may be provided as corrugations 9, see Fig. 5. The corrugations 9 are provided throughout the thickness or depth of the film strip F and preferably extended transversely across the entire width of said film strip F. These corrugations 9 may extend perpendicularly across the film at right angles to the edge of the film, also as shown in Fig. 2, or they may extend diagonally across the film at an acute or obtuse angle to the film edge as shown at 9''' in Fig. 3.

It is also optional to provide the embossings in a variety of different forms, as shown in Fig. 4. Said embossings may be provided at regular or irregular intervals in the form of regular or irregular polygons 9', or as regular or irregular conic sections 9'', and may be located only centrally of film strip F. Also the variety of formations for the embossings may be provided in any combination of them.

The crimped or embossed portion of the film may be of any longitudinal extent. Said crimped portion may be of a length only sufficient partially to encircle the reel core, or of a length sufficient to encircle the core 5 one or more times.

The longitudinal extent of the crimped portion of the film is preferably at least sufficient once to encircle the film core 5. It is even more desirable to extend the crimped portion to a length so that several convolutions of crimped film encircle the core 5.

The film of the invention is wound onto the film core in the usual manner by insertion of the inner end f', see Fig. 5, into the slot 6 and rotation of the core to wind the crimped portion and film strip F thereon. The embossings or corrugations 9 may be more or less flexed or flattened when wound upon the core, and the embossings or corrugations 9 of the second and subsequent convolutions may register or be staggered with respect to the embossings or corrugations 9 on the subjacent convolution of crimped film. In any event, the coiled, crimped portion of the film forms a resilient center for the film coil so that shrinkage in the film and the resultant radial pressure merely causes compression of this resilient center and compression of the flexible embossings or corrugations 9. Said crimped portion, which is formed by the flexible embossings, does not permit the subsequent film shrinkage to stretch any of the convolutions tightly across the slot 6 or opening 7, and thus prevents the objectionable embossing of the film convolutions by the edges of these openings in the core 5. The outer convolutions of the film will lie in an even curve over these openings in the core 5. This desirable result is thus conveniently obtained and is illustrated in Fig. 5.

Other modifications of the present invention may readily occur to those familiar with packaging and winding of film strips. The present disclosure is, therefore, to be construed only in an illustrative sense. The scope of the invention is defined by the appended claims.

Having thus described my invention, what I claim as new and desire to secure by Letters Patent of the United States is:

1. The combination with a film reel having a core which is provided with an interruption in the surface thereof, of a film strip wound on said core and having a plurality of flexible embossings only in the inner end of said film strip and forming for the film coil a resilient inner layer which, upon shrinkage of the film, is compressed and prevents objectionable embossing of the other film convolutions by the margins of the interruption in said core.

2. The combination with a film reel having a core which is provided with an interruption in the surface thereof, of a film strip coiled around said core and having an inner end which is provided with a plurality of flexible embossings and which is of sufficient length at least partially to encircle said core.

3. The combination with a film reel having a core which is provided with an interruption in the surface thereof, of a film strip coiled around said core and having an inner end which is provided with a plurality of lateral flexible embossings and which is adapted upon coiling of the film to form a resilient center for the film coil.

4. As an article of manufacture, a film strip including only on the inner end thereof, a plurality of flexible embossings provided and arranged so as to form a resilient inner layer for the film when wound into a coil.

5. As an article of manufacture, a film strip including only on the inner end thereof, a plurality of lateral flexible embossings provided longitudinally of the film at intervals so that when the film is wound into a coil said embossings overlap in staggered relation the embossings on adjacent inner film convolutions.

OTTO WITTEL.